United States Patent [19]
Fletcher et al.

[11] 3,760,394
[45] Sept. 18, 1973

[54] EVENT SEQUENCE DETECTOR

[76] Inventors: James C. Fletcher, Administrator of National Aeronautics and Space Administration with respect to an invention of; Michael F. Hanna, 1213 Chesney Ave., Glendora, Calif. 91740

[22] Filed: Feb. 4, 1972

[21] Appl. No.: 223,560

[52] U.S. Cl.................. 340/223, 340/166, 340/173, 340/415
[51] Int. Cl....................... G08b 23/00, G08b 26/00
[58] Field of Search............................ 340/223, 415

[56] References Cited
UNITED STATES PATENTS

| | | | |
|---|---|---|---|
| 2,960,687 | 11/1960 | Robison | 340/223 |
| 3,017,620 | 1/1962 | Abzug | 340/223 |
| 3,280,335 | 10/1966 | Lien | 340/223 |
| 3,523,278 | 8/1970 | Hinkel | 340/415 |
| 3,524,185 | 8/1970 | Ehni | 340/415 |
| 3,613,092 | 10/1971 | Schumann | 340/223 |

*Primary Examiner*—Thomas B. Habecker
*Attorney*—Monte F. Mott et al.

[57] ABSTRACT

An event sequence detector is disclosed comprising a plurality of input units, each associated with a row of bistable elements arranged in an array of rows and columns. The detector also includes a shift register which is responsive to clock pulses from any of the units to sequentially provide enabling signals on its output lines each of which is connected to the bistable elements in a corresponding column. When an event-indicating signal is received by an input unit it provides a clock pulse to the shift register to provide the enabling signal on one of its output lines. The input unit also enables all its bistable elements so that the particular element in the column supplied with the enabling signal from the register is driven to an event-indicating state.

8 Claims, 7 Drawing Figures

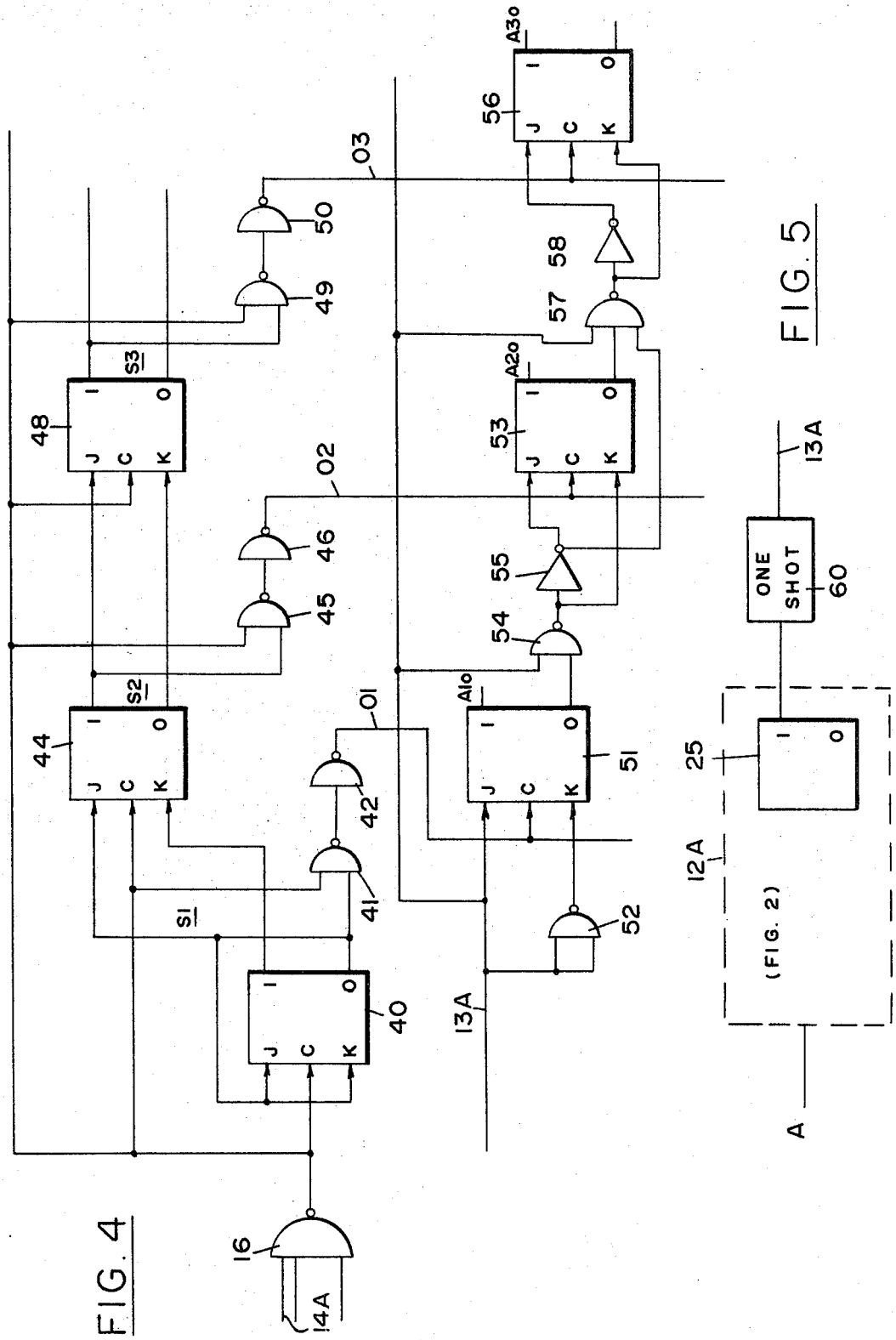

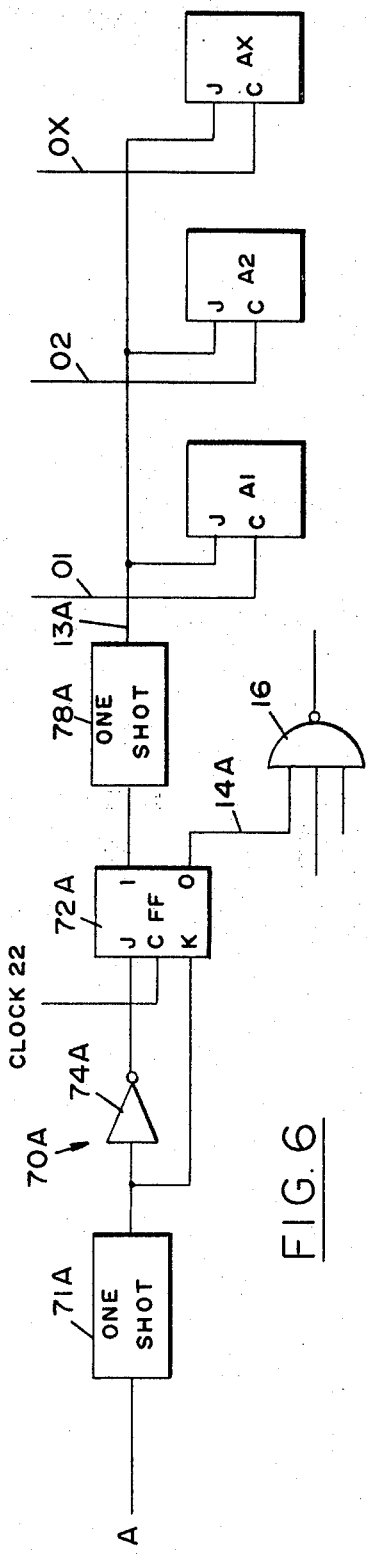

EVENT SEQUENCE DETECTOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention is generally related to an event detector and, more particularly, to a detector for indicating the occurrence of events and their sequence of occurrence.

2. Description of the Prior Art

There are many applications in which it is desired to detect the occurrence of events and their sequence of occurrence. For example, in testing complex instruments it is often desired to know which components or subsystems fail as well as the order of the failures, wherein each failure represents a first event. This can be achieved with a detector capable of detecting the occurrence of the first event only in each source and the sequence in which these first events occur. Likewise, in a large automated system it is often desirable to monitor the performance of subsystems by determining which subsystems are activated as well as the sequence in which they are activated. Assuming that each time a subsystem is activated it represents an event such monitoring can be accomplished by a detector which is capable of sensing the occurrence of events in each of a plurality of sources and one which is further capable of indicating the sequence of occurrence of the various events in the various sources. The prior art does not seem to disclose detectors having such capabilities.

OBJECTS AND SUMMARY OF THE INVENTION

It is a primary object of the present invention to provide a novel event detector.

Another object of the present invention is to provide a novel detector for detecting the occurrence of events in a plurality of sources and the sequence of their occurrence.

A further object of the present invention is the detection of the sequence of events in a plurality of sources.

Still a further object of the present invention is to detect the first event in each of a plurality of sources and the sequence of their occurrence.

These and other objects of the present invention are achieved by providing a detector including an input unit and a row of bistable elements for each source. In one embodiment, designed to detect the first event in a source the input unit is of the latchable type. When an event-indicating signal is received from the source, the input unit enables the bistable elements in the row and causes a clock pulse to be applied to a shift register. Each stage of the latter is connected to corresponding elements in the rows. The clock pulse causes the shift register to shift one stage and provide a clock pulse to a column of elements, so that the particular element, enabled by its input unit and provided with the clock pulse from the shift register, is driven to an event-detection state.

In another embodiment of the invention each input unit is capable of responding to a sequence of event-indicating signals. In this embodiment more than one element in a row may be driven to its event-detection state during a monitoring period. At the end of the period the elements in the event-detection state provide an indication of the number of events occurring in each source and the sequence of their occurrence.

The novel features of the invention are set forth with particularity in the appended claims. The invention will best be understood from the following description when read in conjunction with the accompanying drawings.

BRIEF DESCRIPTION OF THE DRAWINGS

FIG. 4 is a partial block diagram of the embodiment shown in FIG. 1;

FIG. 5 is another embodiment of an input unit; and

FIGS. 6 and 7 are diagrams useful in explaining another embodiment of the invention.

DESCRIPTION OF THE PREFERRED EMBODIMENTS

Figure 1:
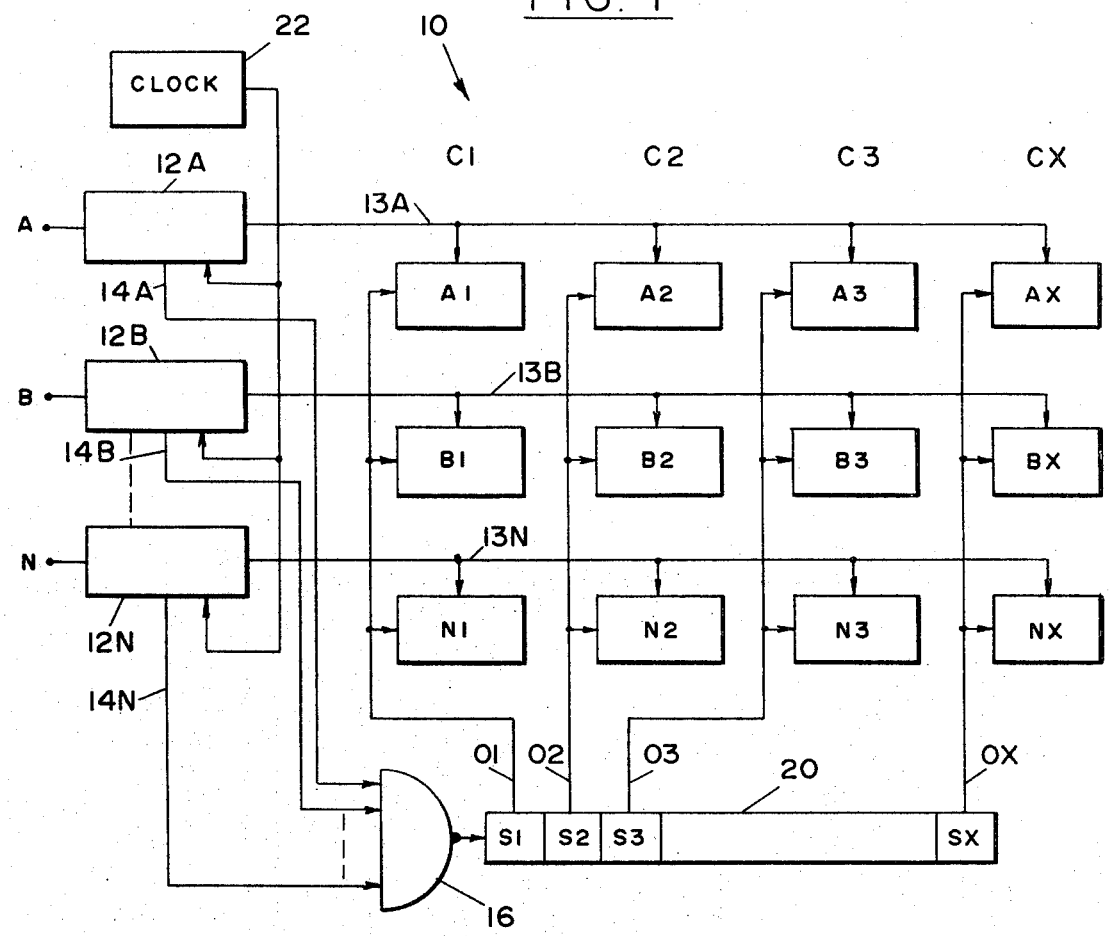
FIG. 1 is a general block diagram of one embodiment of the invention.

As seen from FIG. 1, in one embodiment the novel detector, designated by numeral 10 includes a plurality of input terminals A–N, although for simplicity only terminals A, B and N are shown. The terminals are assumed to be connected to ports or subsystems A–N of a system, each subsystem being of the type in which an event may occur, such as for example subsystem failure. Each event is assumed to be transduced to a logic level, such as true. Thus when a true level is applied to a terminal it acts as an event-indicating signal from the subsystem or signal source to which it is connected.

Each terminal is connected to the input of a latching unit, designated by numeral 12 followed by the terminal's designation letter. Each unit has two output lines 13 and 14 followed by the suffix letter designating the unit. Thus the output lines of unit 12A are designated 13A and 14A. Included in the detector 10 is a plurality of event-indicating units which are arranged in N rows A–N and X columns C1–CX. Each unit, such as A1, is designated by its row letter and column number. All the units in row A are connected to line 13A while those in rows B and N are connected to lines 13B and 13N, respectively.

The output lines 14A, 14B.......14N are connected to a gate 16 with N inputs. The output of this gate is connected to the input of a multistage shift register 20. For an X column array the register includes X stages S1–SX with the output of each stage connected to the units in a different array column.

In operation each latching unit responds to the first event-indicating signal received at the input terminal to which it is connected. In response to this signal the level of the output line 13 changes to true and remains true. Also, in response to the event-indicating signal the latching unit 13 provides a pulse on line 14. This pulse in essence represents an event-reception pulse. The duration of this pulse is controlled by the rate of the clock pulses from a clock 22. Once the level of line 13 is set to true and the pulse is provided on line 14, the latching unit remains in a latched state inhibiting it from responding to subsequently received event-indicating signals and from producing additional pulses on line 14. However, line 13 remains true until the detector 10 is completely reset at the end of the test or monitoring operation. One novel embodiment of the latching unit will be described hereafter in conjunction with FIG. 2.

When one or more simultaneous pulses are applied to the inputs of gate 16, the latter provides an output pulse which causes the shift register to shift by one stage and supply an enabling signal on one of its output lines to the units in the column connected to the particular line. Any unit in the array which is connected to a line 13 in a true state and to a register output line on which an enabling signal is applied is driven to an event-indicating state, hereafter referred to as set. Once a unit is driven to such a state it inhibits all subsequent units in its row from being driven to this state. Thus in the detector shown in FIG. 1, only one unit in each row can be driven to the set state. In this embodiment the maximum number of columns X is never greater than N.

The foregoing description may be summarized with a specific example. Initially all units and the stages of register 20 are assumed to be in a reset state. Let it be assumed that the first event-indicating signal is applied to terminal B. Line 13B is set to true and a pulse is supplied to gate 16 causing it to apply a shift or clock pulse to register 20. The first clock pulse which is supplied to the shift register causes it to apply an enabling signal on line 01. This enabling signal acts as a clock pulse and causes any unit in column C1 of the array which is also connected to a true line 13, to be driven to its set state. In the present example since only line 13B is true only unit B1 is driven to its set state. Latching unit 12B is disabled from further supplying pulses on line 14B to the gate 16 even though subsequently additional true signals may be applied to terminal B. Also, once unit B1 is set it inhibits all subsequent units (B2–BX) from being set.

Assuming that the next event-indicating signal is applied to terminal N, latching unit 12N sets line 13N to true and the pulse on 14N activates the gate 16, causing register 20 to provide an enabling signal on output line 02. As a result unit N2 is set and it inhibits all subsequent units in row N from ever being set during the particular test.

Any event-indicating signals subsequently supplied to terminals B or N do not affect the detector since in each of these rows one unit is already set and both latching units 12B and 12N are latched. However, if an event-indicating signal is applied to terminal A, it would latch unit 12A. The supply of a pulse to gate 16 would cause the register to provide an enabling pulse on line 03. This pulse together with the setting of line 13A to true would cause unit A3 to switch to its set state.

At the end of the test operation the units in the array which are in their set state indicate the sources of the event-indicating signals as well as their sequence of arrival. In the particular example since units B1, N2 and A3 are set it indicates that at least one event-indicating signal was received at each of terminals B, N and A. Their sequence of arrival is indicated by the columns in which the set units are located. In the particular example it is seen that the source connected to terminal B was the first to provide an event-indicating signal, while the source connected to terminal A is the last to have provided such a signal.

It should be pointed out that if event-indicating signal are applied to two or more input terminals within the same clock period, two or more latching units may become latched together and two or more units in the same column of the array may be set, simultaneously. For example, assuming that the detector is reset and thereafter both terminals A and B are set to true during the same clock period, both units 12A and 12B are latched. Thus, both lines 13A and 13B are set to true. The simultaneous pulses on line 14A and 14B activate gate 16 which provides a single pulse to the register 20, which causes an enabling signal to appear on line 01. Since lines 13A and 13B are both true, both units A1 and B1 are set simultaneously. This indicates that terminals A and B were the first to receive event-indicating signals and that these signals arrived simultaneously, i.e. within the same clock period.

Figure 2:
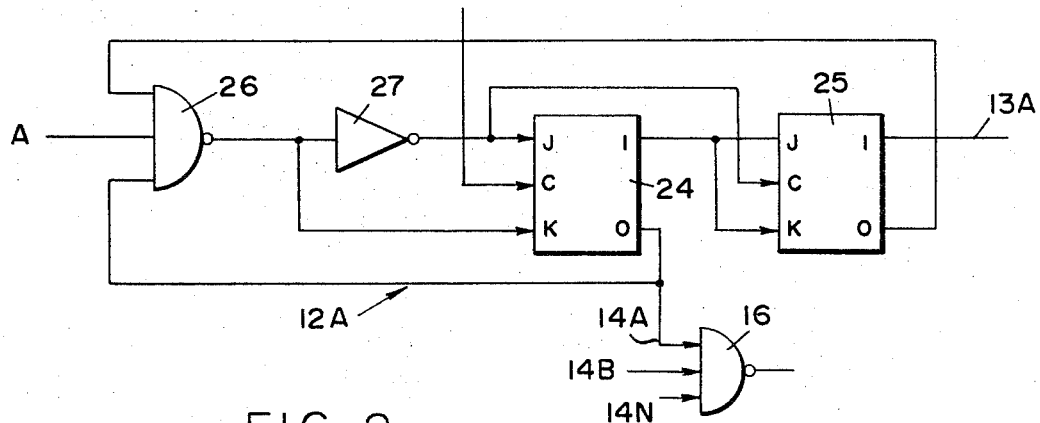
FIG. 2 is a detailed block diagram of an input unit 12A shown in FIG. 1.

Attention is now directed to FIG. 2 which is a diagram of one embodiment of the latching unit 12A, the other latching units being identical therewith. It includes a pair of JK flip-flops 24 and 25, NAND gate 26 and an inverter 27. The 1 and 0 outputs of FF's 24 and 25 are connected to lines 13A and 14A respectively and the input terminal A is connected to one input of gate 26 while, the $c$ (clock) input of FF24 is connected to the clock 22. These flip-flops as well as all others to be described herein are assumed to be clocked by true-to-false transitions at the $c$ inputs. It is apparent however that the transition or level required for clocking depend on the particular circuits which are employed and therefore the example described herein should be regarded as but one implementation of the teachings of the invention.

Figure 3:
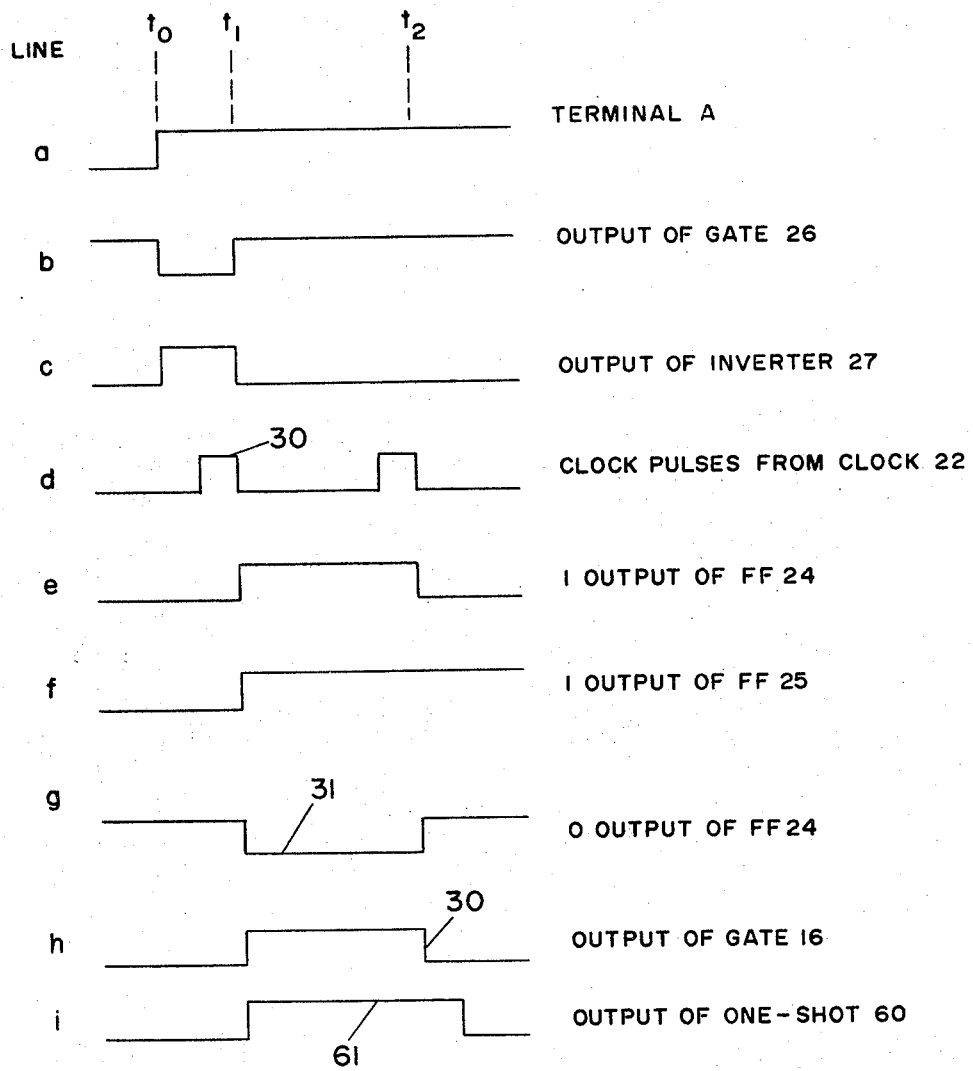
FIG. 3 is a waveform diagram useful in explaining the embodiment shown in FIG. 1.

In the unlatched condition both FF's are reset, the output of gate 26 is true and that of the inverter is false. When an event-indicating signal is applied at terminal A, at time $t_0$ as shown in FIG. 3, line $a$, terminal A is at true level or simply true. Thus all three inputs of gate 26 are true and consequently its output becomes false (FIG. 3 line $b$) and that of the inverter becomes true (line $c$). When the trailing edge (i.e. the true to false transition) of the first clock pulse 30 (line $d$) is sensed at $t_1$ it clocks FF24 and since its J input is true it sets FF24 so that its 1 output is true (line $e$). As FF24 is set, its 0 output goes false (line $g$) and consequently gate 26 is set to true (line $b$) and that of inverter 27 goes false. Also when line 14A, connected to the 0 output of FF24, goes false it enables NAND gate 16 whose output goes true (line $h$).

When the trailing edge of the next clock pulse arrives at $t_2$, FF24 is reset (lines $e$ and $g$) and its 0 output goes true. Consequently, gate 16 is disabled and its output goes false (line $h$). It is the true-to-false transition of the output of gate 16, represented in line $h$ by numeral 30, which serves as the clocking pulse for the shift register 20. It should be pointed out that FF25 remains set (line $f$). Thus line 13A remains true from time $t_1$ on. Also since FF25 is set its 0 output is false. Thus NAND gate continues to provide a true output irrespective of subsequent changes in the level of terminal A from false to true. Consequently the latching unit remains latched until FF25 is reset at the end of the test operation.

It should be noted that the two outputs of the unit are the continuous true output on line 13A and the false pulse 31 (line $g$) on line 14A when FF24 is in its true state. The duration of this pulse is clearly a function of the clock rate.

Attention is now directed to FIG. 4 which is a diagram of stages S1–S3 of shift register 20 and units A1, A2 and A3 of row A, as embodied in one embodiment of the invention. All stages following stage S3 are identical with stage S3 and all units following unit A3 are identical therewith. Likewise units in other rows are identical with those of row A. Stage S1 comprises a flip-flop (FF) 40, a NAND gate 41 and an inverter 42. Stage S2 comprises FF44, a NAND gate 45 and an inverter 46, and stage S3 comprises FF48, NAND gate 49 and inverter 50. Unit A1 comprises a FF51 and a NAND gate 52, while unit A2 comprises FF53, NAND gate 54 and inverter 55 and unit A3 comprises FF56, NAND gate 57 and inverter 58. All of the FF's are JK FF's assumed to be clocked by a true to false transitions and all the NAND gates are two-input gates except NAND gate 57 which is a three-input gate.

Initially all FF's are reset. For explanatory purposes it is assumed that the first event is received at terminal A. At time $t_1$ (see FIG. 3) when the output of gate 16 becomes true, the output of gate 41 is false and that of inverter 42 becomes true. Also line 13A becomes true. At time $t_2$ when the output of gate 16 goes from true to false, a clock pulse is applied to all the FF's of the shift register. Since FF's 40 and 44 have their J inputs connected to the 0 output of 40 which is still reset, these two FF's are set. Also, the clock pulse from gate 16 switches gate 41 to true and, therefore, the output of inverter switches from true to false, thereby applying a clock pulse on output line 01. Since line 13A is true FF51 is set thereby indicating the detection of an event. Such indication may be determined by connecting the 1 output of FF51 to an appropriate lamp, designated by numeral $A1_0$, which is illuminated when FF51 is set. The 1 outputs of the other FF's of the array units are assumed to be connected to similar lamps each designated by the units designation, followed by a 0 subscript.

Once FF51 of A1 is set its 0 output is false. By supplying it to gate 54 of A2 whose output is in turn supplied to gate 57 of A3, the subsequent units A2, A3 and all subsequent units in row A are inhibited from being set, even though line 13A is true and even though pulses may be applied subsequently to output lines 02–0X.

After the first pulse 30 from gate 16 is received, FF's 40 and 44 remain set. Then when the next clock pulse is received fom gate 16, FF44 is reset and FF48 is set and the true-to-false transition of the output pulse of gate 16 causes gate 45 to provide a false-to-true transition, which in turn causes inverter 46 to provide a clock pulse (true-to-false transition) on output line 02. Thus successive pulses from gate 16 clock the shift register to provide enabling signals or clock pulses successively on its output lines.

As seen from FIG. 4, the various stages of the shift register are substantially identical. In each stage except S1, the FF is set when a clock pulse is supplied by the preceding stage and it is reset when a clock pulse is supplied by its stage. In stage S1 however FF40 is set by the first pulse from gate 16 and remains set. Also, the various units in the array (of rows and columns) are substantially identical except for minor variations in the inputs of the NAND gates.

It should be appreciated that the function fo the NAND gates and the inverters in the various units of the array is to inhibit subsequent units from becoming set once a preceding unit is set to indicate an event detection. Such an inhibiting arrangement is needed if the output line such as 13A., of the latching unit 12A, remains true as long as the unit is latched. These NAND gates and inverters may however be eliminated if the duration during which a line 13 is true is limited and is caused to coincide with a clock pulse on one of the output lines of the shift register. As shown in FIG. 5, the 1 output of FF25 of unit 12A may be connected to a one shot 60 whose output is connected to line 13A. The one shot 60 is assumed to be triggered when FF25 is set, i.e., the 1 output is true, to provide a true output to line 13A for a period which is longer than one clock period. The true output of the one shot is designated by numeral 61 in line $i$ of FIG. 3. The reason that the true output has to be present for more than one clock period is to acount for the delay produced by gate 16 and one stage of the register in producing a clock signal on one of the register's output lines in response to a pulse on one of lines 14A.

Once the particular unit in row A which is supplied with the clock pulse from the register 20 is set, the level on line 13A returns to false. Since the unit 12A is of the latchable type FF25 is only set once and therefore the one-shot 60 provides only one true output, thereby enabling the setting of only one unit in row A. Therefore, the various NAND gates and inverters which interconnect the units in the row are not needed. It should be apparent that in such an embodiment a one-shot is connected between each input unit and its corresponding line 13. Thus the elimination of NAND gates such as gates 52, 54, 57, etc., and inverters 55, 58, etc., is achieved at the price of N one-shots.

Summarizing the foregoing description two embodiments of an event-sequence detector have been described. In either embodiment, the input unit (such as 12A) for each source is of the latched type. When the first event-indicating signal is received from a source, the input unit provides two output signals and thereafter the unit becomes latched so that subsequent signals from the source can't be received. One output signal of the unit, represented by the false level 31 of the 0 output of FF24 in line $g$ of FIG. 3, is supplied to gate 16 for clocking the shift register. In one embodiment the other output is the true level of the 1 output of FF25 and shown in line $f$. In this embodiment since this level continues to be true, the various units of the matrix row to which this output signal is supplied need be connected as shown in FIG. 4. This is necessary to insure that once a unit in a row is set all subsequent units can't be set.

In the other embodiment the second output signal of the input unit is the output of the one-shot which is true for a limited duration only. The duration is chosen so that when a clock pulse is received on one of the output lines of the shift register; all the J inputs of the FF's in the row are true. However, since the clock pulse is supplied only to one FF, only it is set. Since the one-shot produces a true output during only one period or duration, only one unit can be set in each row.

Although in the foregoing embodiments each input unit, such as unit 12A shown in FIG. 2, is assumed to be of the latched type, the invention is not intended to be limited thereto. If desired each unit may be of the unlatched type. Such a unit is capable of responding to a succession of event-indicating signals from the source to which it is connected. This would enable the detector to set more than one unit in each row. However, since the clocking of the shift register is subject to the outputs of all the input units, the units which are set in each row would depend on the relative times of arrival of the event-indicating signals from the various sources. This embodiment may best be explained in connection with FIGS. 6 and 7.

In FIG. 6, only an input unit connected to source A and the units of row A together with gate 16 and the shift register 20 are shown. Basically, the input unit 70A comprises an input one-shot 71A which is connected to terminal A. The output of the one-shot is supplied to the $k$ input of a JK FF 72A and through an inverter 74A to the J input of FF 72A. FF 72A is clocked by clock pulses from clock 22. The clock pulses are diagrammed in line $a$, FIG. 7. When an event-indicating signal is received at $t_5$ at terminal A, as represented by the true pulse 75 on line $b$ of FIG. 7, the one-shot 71A is enabled. It provides a false pulse 76 (line $c$) of a selected duration. The duration is chosen to be somewhat longer than one clock period. Thus the output of inverter 74A becomes true, so that when clock pulse 77 arrives at $t_6$, FF 72A is set (line $d$). When it is set its 0 output goes false (line $e$), enabling gate 16 as herebefore explained. Also the output of FF 72A is supplied to a one-shot 78A whose output (line $f$) is connected by line 13A to all the J inputs of units A1–AX. One-shot 78A provides a true pulse 80 of a duration somewhat longer than one clock period. Then when the next clock pulse 81 arrives its trailing edge at $t_7$ resets FF 72A (lines $d$ and $e$) so that the input unit is ready for the next event-indicating signal. Also the resetting of FF 72A causes the gate 16 to provide a true to false clocking transition for the shift register 20. It should be appreciated that in this embodiment the highest rate of event-indicating signals which can be sensed from any source is one half the clock rate. However, unlike the prior two embodiments in this embodiment more than one unit in row A may be set during the test or monitoring period. The input units for the other sources are identical with unit 70A, each including a FF70 followed by the source's letter designation. It should be pointed out that since in this embodiment more than one unit may be set in any one row, the number of columns designated X may be greater than N.

The operation of this embodiment may be summarized in connection with a specific example. Let us assume that event-indicating signals are received from the various sources during periods P1–P5 as shown in the following table:

TABLE

| PERIOD | SOURCE |
| --- | --- |
| P1 | A |
| P2 | D |
| P3 | B,C |
| P4 | A,D,E |
| P5 | A,E |

It should thus be apparent that in column C1 of the array, corresponding to period P1, only unit A1 is set. Then unit D2 is set in column C2. When event-indicating signals from B and C are received during the same period P3, both B3 and C3 are set. Then A4, D4 and E4 are set following by the settings of A5 and E5. It is thus seen that in this embodiment all (rather than only the first) event-indicating signals from each source are monitored and detected by the number of set units in each row. Their times of occurrence relative to the occurrences of signals from other sources is determined by which units are set in each row. For example, since in column C1 only A1 is set, it indicates that the first event was received from source A. The second event from source A is indicated by the set A4. However, since this unit is in column 4 it is clear that the second event from source A arrived after the arrival of the first event from source D, represented by set unit D2 and after the arrivals of events from sources B and C, represented by the set units B3 and C3.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A detector for providing an indication of the sequence of occurrence of events comprising:

$n$ input terminals for receiving event-indicating signals from $n$ sources;

a separate latching unit coupled to each input terminal the unit having first and second output terminals providing a first continuous signal on said first output terminal and an event reception pulse on said second output terminal only when the first event-indicating signal is received by its corresponding input terminal;

a plurality of element means arranged in an array of $n$ rows and X columns arranged in a sequence from 1 to X each element means being drivable between first and second states the elements in each row being associated with a different latching unit;

first connecting means for connecting the element means in each row to the first output terminal of the latching unit with which they are associated;

column control means having X output lines in a sequence from 1 to X, each coupled to the element means in a corresponding column;

means responsive to the event reception pulses on the second output terminals at successive time periods for controlling said column control means to provide successive enabling signals on its output lines, with an element means coupled to a first output terminal at which a first continuous signal is applied and to an output line of said column control means at which an enabling signal is applied being driven from its first state to its second state; and second connecting means for interconnecting the element means in each row so that when any element means in a row is driven to its second state all subsequent element means in that row are inhibited from being driven to said second state, X being not greater than n.

2. The arrangement as recited in claim 1 wherein the means responsive to said event reception pulses comprises a gate having n input terminals coupled to the second output terminals of said n latching units for providing a control signal to said column control means whenever one or more event reception pulses are simultaneously applied to its input terminals.

3. The arrangement as recited in claim 2 wherein said column control means comprises a shift register of X substantially identical stages each including one of the output lines, said shift register being responsive to each enabling signal following a first enabling signal from said gate for sequentially shifting one of the stages thereof from a first state to a second state and a preceding stage previously in said second state to said first state, with the preceding stage providing the enabling signal on the output line thereof.

4. The arrangement as recited in claim 1 further including a source of clock pulses coupled to said n latching units, each latching unit including first and second flip-flops which are respectively connected to said second and first output terminals of said latching unit.

5. An event sequence detector for detecting events in any of $n$ sources comprising:
   $n$ input means each coupled to a different source with which it is associated for providing first and second output signals for each event-indicating signal which is received from the source with which it is associated;
   first means coupled to said n input means and responsive to said first output signals for successively providing enabling signals on a plurality of output lines thereof in response to a succession of one, or more than one simultaneously received first output signals; and
   switchable means including a separate sequence of elements associated with each input means and coupled thereto, with corresponding elements in said sequences being connected to said output lines of said first means, whereby in each sequence an element coupled to an input means providing said second output signal and to an output line on which an enabling signal is applied switches to an event-indicating state.

6. The arrangement as recited in claim 5 wherein said first means comprises gate means for providing a shift control signal when at least one first output signal is supplied thereto, and a shift register coupled to said gate means and responsive to each shift control signal for providing successively said enabling signals on said output lines in response to a succession of said shift control signals.

7. The arrangement as recited in claim 6 wherein said switchable means comprise an array of bistable elements arranged in rows and columns, with the elements in each row associated with a different input means and responsive to the second output signal therefrom and the elements in each column being associated with a different output line of said shift means, an element switching to an event-indicating state only when a second output signal is supplied by the input means with which it is associated and an enabling signal is applied to the output line to which it is connected.

8. The arrangement as recited in claim 7 further including clock means for clocking said n input means with clock pulses of a preselected clock period, whereby different input means which receive event-indicating signals from the sources with which they are associated during any clock period provide said first and second output signals simultaneously so that bistable elements in rows associated therewith and in the same column are switched simultaneously to said event-indicating state.

* * * * *